United States Patent [19]
Baillieul et al.

[11] Patent Number: 5,584,234
[45] Date of Patent: Dec. 17, 1996

[54] COOKING APPLIANCE, SUCH AS A FRYER FOR EXAMPLE, HAVING A CONDENSATION DEVICE FOR COOKING VAPOURS

[75] Inventors: Philippe L. R. Baillieul, Saint-Germain-la-Blanche-Herbe; Alain Bouffay, Herouville-Saint-Clair; Pierre Chartrain, Soliers-Bourguebus; Guy Collas, Ifs, all of France

[73] Assignee: Moulinex S.A., Bagnolet Cedex, France

[21] Appl. No.: 535,039

[22] PCT Filed: Apr. 12, 1994

[86] PCT No.: PCT/FR94/00406

§ 371 Date: Oct. 16, 1995

§ 102(e) Date: Oct. 16, 1995

[87] PCT Pub. No.: WO94/23625

PCT Pub. Date: Oct. 27, 1994

[30] Foreign Application Priority Data

Apr. 16, 1993 [FR] France ................. 93 04539

[51] Int. Cl.⁶ ..................... A47J 36/38; A47J 37/12
[52] U.S. Cl. ................. 99/403; 55/DIG. 36; 126/299 D; 210/167; 210/DIG. 8
[58] Field of Search ................. 99/403–418, 330; 126/299 D, 299 E; 55/228, DIG. 36; 210/167, 184, 187, 471, DIG. 8

[56] References Cited

U.S. PATENT DOCUMENTS

| | | | |
|---|---|---|---|
| 4,505,193 | 3/1985 | Mariotti | 99/330 |
| 4,530,717 | 6/1985 | Bohrer, Jr. et al. | 55/DIG. 36 |
| 4,539,898 | 9/1985 | Bishop et al. | 99/407 |
| 4,668,390 | 5/1987 | Hurley et al. | 210/167 |
| 4,995,312 | 2/1991 | Leiros | 99/411 |
| 5,165,329 | 11/1992 | Jacob et al. | 99/407 |
| 5,297,474 | 3/1994 | Tabuchi | 210/DIG. 8 |
| 5,367,949 | 11/1994 | Nitschke et al. | 55/DIG. 36 |
| 5,379,684 | 1/1995 | Ettridge | 99/413 |
| 5,452,648 | 9/1995 | Hohler et al. | 99/408 |

FOREIGN PATENT DOCUMENTS

| | | |
|---|---|---|
| 0343141 | 11/1989 | European Pat. Off. . |
| 2239224 | 2/1975 | France . |
| 592773 | 2/1934 | Germany . |
| 8502304 | 5/1985 | Germany . |
| 4005924 | 1/1992 | Japan . |
| WO91/04698 | 4/1991 | WIPO . |

*Primary Examiner*—Timothy F. Simone
*Attorney, Agent, or Firm*—Young & Thompson

[57] ABSTRACT

A cooking apparatus including an open housing (1) closed by a lid (8), a cooking vat (4) provided inside the housing, and a cooking vapor condenser device (13) provided outside the housing. At least one vapor outlet (22) is provided between the upper portion of the vat (4) and the condenser device (13) and includes an upstream section (24) integral with the lid (8) and having one end (25) in communication with the upper portion of the vat (4), and a downstream section (27) connecting the other end (26) of the upstream section with the condenser device (13). This system is suitable for household deep fryers.

8 Claims, 1 Drawing Sheet

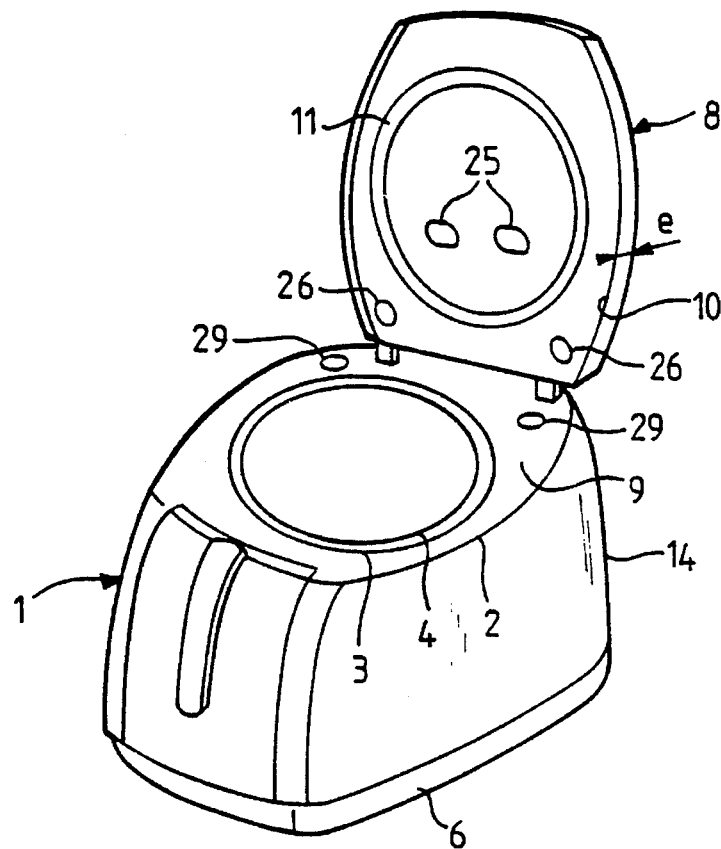
FIG_1
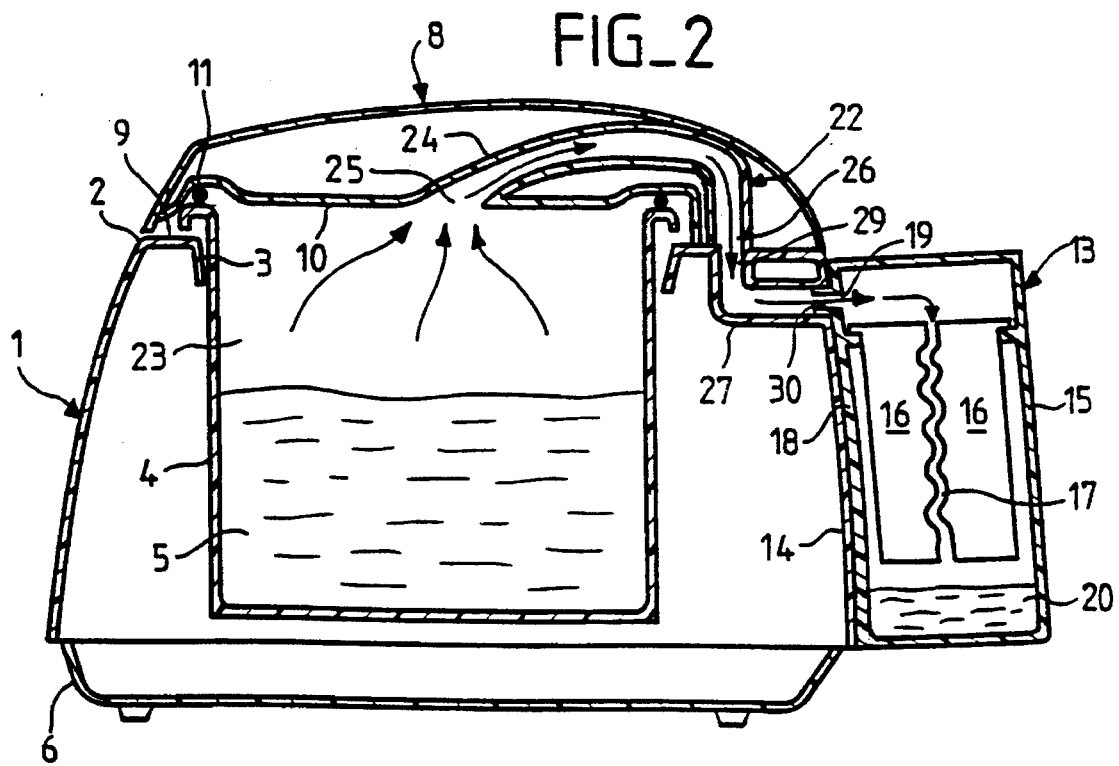
FIG_2

COOKING APPLIANCE, SUCH AS A FRYER FOR EXAMPLE, HAVING A CONDENSATION DEVICE FOR COOKING VAPOURS

FIELD OF THE INVENTION

The present invention relates to cooking appliances, such as fryers for domestic use for example, comprising an open casing able to be closed off by a lid, a cooking container disposed inside the casing and closed in a substantially sealed manner by the lid during the cooking phase, and a condensation device for cooking vapours placed outside the casing.

BACKGROUND OF THE INVENTION

In known appliances of this type, the condensation device is generally mounted on the side of the casing and eliminates through condensation the vapours which are emitted during cooking and which contain unwanted odorous substances. This device of the condensing type constitutes in itself a particularly effective anti-odour device since it permits total and continuous elimination of vapours containing the unwanted odorous substances, and this outside the cooking appliance, in contrast with the conventional anti-odour filter incorporated in the lid of the apparatus.

For appliances of this type using as an anti-odour device a condensing device positioned laterally on the casing containing the cooking container, it then proves necessary to establish, between the container and the condensing device, a narrow passage suitable for allowing the outflow or discharge of the cooking vapours through the closed casing.

SUMMARY OF THE INVENTION

The invention therefore proposes to produce, in a simple and active manner, this passage designed for the outflow of cooking vapours from the cooking container to the condensing device.

According to the invention, this result is attained owing to the fact that the cooking appliance, of the type outlined above, also comprises at least one outflow duct for the cooking vapours connecting the upper volume of the cooking container to the condensation device, and having a so-called upstream section which forms an integral part of the lid and whose two ends each open out from the said lid, one of these ends of the upstream section opening out into the upper volume of the container, and a so-called downstream section which connects the other end of the upstream section to the condensation device.

Through this integration of the upstream section of the duct into the lid, a path for the cooking vapours within the lid is obtained which is simple, easy to establish, and perfectly channelled. Such simplicity of design is, moreover, well suited to the mass-production of appliances.

The lid is preferably mounted so as to be removably hinged on a top edge of the casing, so that, once removed, the lid including the upstream section of the duct is easily cleanable, even in a dishwasher.

BRIEF DESCRIPTION OF THE DRAWINGS

Other characteristics and advantages of the invention will, moreover, emerge from the description that follows of a particular embodiment taken as a non-limitative example, illustrated in the accompanying drawings in which:

FIG. 1 is a diagrammatic perspective view of a cooking appliance, such as a fryer, according to the invention, the lid being open; and FIG. 2 is a diagrammatic view in vertical section, to a larger scale, of the fryer of FIG. 1, the lid being closed.

DETAILED DESCRIPTION OF THE INVENTION

The cooking appliance shown diagrammatically in FIGS. 1 and 2 is a domestic fryer which comprises a casing or receptacle 1, substantially parallelepipedal in shape, having, at a short distance from its top edge 2, an opening 3 in which is placed a metal container 4 containing a cooking bath 5. The casing 1 is supported by a base 6, preferably produced in a single piece with the casing, and is designed to be closed off by a lid 8, of thickness e, mounted so as to be removably hinged on the flat top face 9 of the casing by means of demountable hinge means (not shown).

The lid 8 has on its internal face 10 a joint 11, shaped so as to produce a seal between the lid and the cooking container 4 when the lid is closed.

The casing 1, the base 6 and the lid 8 are moulded from a plastic material such as, for example, polypropylene, which is particularly economical and easy to maintain.

As shown in FIG. 2, the fryer also comprises a condensation device for vapours 13, which is positioned on the outside of the casing 1. In this example shown in FIG. 2, the condensing device 13 is applied to the rear face 14 of the casing 1 while being held in place on the latter by means of fixing elements (not shown). The condensation device 13 could, of course, be applied laterally on the casing 1, without departing from the scope of the invention.

As an example, in no way limitative, the fume condensation device 13, as illustrated in FIG. 2, is formed by a box or sealed reservoir 15, substantially parallelepipedal in shape, containing two cooling cartridges or blocks 16 extending vertically and defining between them a condensation channel 17 with a coil-shaped vertical section. The reservoir 15 has on its rear face 18 applied against the casing 1 two fume inlet orifices 19, only one of which is visible in FIG. 2. The base of the two cooling blocks 16 is separated from the base of the reservoir 15 so as to create a zone 20 designed to collect the condensate leaving the channel 17.

According to the invention, the fryer comprises one or more ducts, only one of which is visible in FIG. 2 and bears the reference numeral 22, which are each designed to connect, during frying (the lid 8 being closed), the upper volume 23 of the cooking container 4 to the fume condensation device 13 in order to ensure the outflow or discharge of the cooking vapours, and which each have an upstream section 24 forming an integral part of the lid 8 and having two ends 25, 26 opening out from the lid, one 25 of these ends opening out into the upper volume 23 of the container, and a downstream section 27 connecting the other end 26 of the upstream section 24 to the fume condensation device 13, see FIG. 2.

In the example embodiment depicted in FIG. 2, the upstream section 24 of the duct 22 is integrally formed within the thickness of the lid 8, preferably during the moulding of the latter, so that its two ends 25, 26 open out, in one case 25 substantially in the center of the internal face 10 of the lid 8, and in the other case 26 at a point on this same face 10 situated in the vicinity of the rear face 14 of the casing 1.

As a variant (not illustrated), the upstream section of the duct consists of a rib moulded in one piece with the lid and in the form of a channel.

As FIG. 2 shows, the downstream section 27 of the duct 22 is now formed in the body of the casing 1, preferably during the moulding of the latter, and has a cross-section of overall "L" shape on which the end 29 of the vertical leg opens out from the top face 9 of the casing to communicate directly, coinciding perfectly, with the corresponding end 26 of the upstream section 24 when the lid 8 is closed, and on which the end 30 of the horizontal leg opens out from the rear face 14 of the casing 1 and communicates directly with the orifice 19 of the reservoir 15.

It should be noted that the integration of the downstream section 27 of the duct 22 in the casing 1 advantageously replaces the use of a conventional connection tube.

Furthermore, this integrated downstream section 27 is relatively short, which therefore facilitates its cleaning.

In the embodiment illustrated in FIG. 1, the production of two ducts is envisaged, each of the type depicted at 22 in FIG. 2, which extend symmetrically with respect to a median plane of the fryer; in this FIG. 1, only the two ends 25, 26 of each of the two upstream sections formed in the lid 8 are visible, along with the end 29 of each of the two downstream sections formed in the casing 1, the respective ends 26 and 29 corresponding to one another.

The discharge and elimination of the vapours present in the fryer are effected in the following manner, with reference to FIG. 2.

During frying, the vapours (represented by arrows) which are released and which contain unwanted odorous substances escape first through the upstream section 24 incorporated into the lid 8, then through the communicating downstream section 27 integrated into the casing 1, and pass into the reservoir 15 via the inlet orifice 19. They are then directed downwards through the condensation channel 17 defined by the two cooling cartridges 16 in contact with which they are effectively eliminated by condensation, the condensed vapour arriving in the collection zone 20.

We claim:

1. Cooking appliance, comprising an open casing able to be closed off by a lid, a cooking container disposed inside the casing enclosed in a substantially sealed manner by the lid during a cooking phase, a condensation device positioned outside the casing for condensing cooking vapors, and outflow means for the cooking vapors connecting an upper volume of the cooking container to an inlet of the condensation device, said outflow means comprising at least one outflow duct having an upstream section integral with the lid, and two ends each opening out from the lid, one of said ends of the upstream section opening out into the upper volume of the container, and a downstream section connecting the other end of the upstream section to the condensation device.

2. Cooking appliance according to claim 1, wherein the upstream section of the outflow duct is formed within the thickness of the lid.

3. Cooking appliance according to claim 1, wherein the upstream section of the outflow duct comprises a rib produced in the lid and in the form of a channel.

4. Cooking appliance according to claim 1, wherein the casing is solid around its opening and has a substantially flat peripheral top face, and the condensation device is mounted on a lateral face of the casing, said downstream section of the outflow duct having a first end, a second end, and being formed in the body of the casing such that the first end opens out from the top face of the casing and communicates directly with the other end of the upstream section, and the second end opens out from the lateral face of the casing and communicates directly with an orifice formed in the condensation device.

5. Cooking appliance according to claim 1, wherein the casing is solid around its opening and has a substantially flat peripheral top face, and the condensation device is mounted on a rear face of the casing, said downstream section of the outflow duct having a first end, a second end, and being formed in the body of the casing, said downstream section having an overall cross section in the shape of an L, with a free end of the vertical leg of the L comprising the first end opening out from the top face of the casing, and a free end of the horizontal leg of the L opening out at the rear of the casing at the level of an orifice of the condensation device.

6. Cooking appliance according to claim 4, wherein the casing and the lid are each molded from a plastic material, and the upstream section and downstream section of the outflow duct are formed during the molding of the lid and of the casing respectively.

7. Cooking appliance according to claim 5, wherein the casing and the lid are each molded from a plastic material, and the upstream section and downstream section of the outflow duct are formed during the molding of the lid and of the casing respectively.

8. Cooking appliance according to claim 1, wherein the lid is mounted so as to be removably hinged on a top edge of the casing.

* * * * *